SAMUEL NATELSON
*INVENTOR.*

SAMUEL NATELSON
INVENTOR.

BY George B. Oujevolk

ATTORNEY

SAMUEL NATELSON
*INVENTOR.*

BY George B. Oujwolk

ATTORNEY

SAMUEL NATELSON
*INVENTOR.*

BY George B. Gujevolk

ATTORNEY

United States Patent Office 3,450,624
Patented June 17, 1969

3,450,624
APPARATUS FOR THE SEPARATION OF CHEMICAL COMPONENTS BY THE COMBINATION OF ELECTROPHORESIS AND GEL FILTRATION
Samuel Natelson, Chicago, Ill., assignor to Fisher Scientific Company, Pittsburgh, Pa., a corporation
Filed July 20, 1966, Ser. No. 566,553
Int. Cl. B01k 5/00
U.S. Cl. 204—299                        9 Claims The present invention relates to the separation of chemical components by the combination of electrophoresis and gel filtration.

Heretofore, it has been demonstrated that compounds could be separated on ion-exchange columns or on gel columns, the molecules being sorted by virtue of their different molecular size.

Certain compounds of similar molecular weight and charge could not be separated by either of these type of columns. In these cases electrophoresis has been resorted to. Thus by separating materials by means of electrophoresis and then subjecting the different substances to columns separation, isolation of the material then becomes possible. This process is time consuming. For example, in removing fractions from columns 400 or more fractions are usually collected and each needs to be analyzed to locate the various fractions. Each of these fractions can then be subjected to electrophoresis for further study.

Attempts to perform the total process on a preparative scale have failed. In one such attempt, glass plates were placed close to each other and a flow of buffer was allowed to flow downward while the electric current ran at right angles (Philpot, J., St. L., Use of Thin Layers in Electrophoretic Separation, 36, Trans. Faraday Soc., 38–46 (1940)). This system failed for lack of resolution. For example, from human serum proteins, only four or five peaks were obtained while it is known that at least 30 well defined components exist in appreciable amounts. This method was, in effect, electrophoresis in a water medium.

Another attempt was to use a sheet of paper, as supporting medium, permitting the flow of liquid down the paper and electrophoresis at right angle to it. This is called continuous electrophoresis. (Haugaard, G., and Kroner, T. D., Partition Chromatography of Amino Acids With Applied Voltage, 70, J. Am. Chem. Soc., 2135–2137 (1948); U.S. Patent No. 2,555,487 (1948)). This system has extremely low capacity and at the same time yields only 5 fraction for human serum.

Another attempt made was to place glass beads between two plates causing the liquid to flow down the glass bead and performing electrophoresis at right angles. (In Modern Laboratory Appliances, Fisher Sci. Co., Pittsburgh, Pa., Catalog #63, page 423 (1963).) This has the disadvantage that channeling effects were observed in the glass beads because they would not be distributed evenly. Cooling was not evenly distributed. This resulted in overheating in the two corners other than where the inlet and outlet were located. Volume of collection of effluent from tube to tube varied widely because channeling occured at the outlets at the base. The electrode chambers were not cooled and products of electrolysis of the electrode chamber were not removed interfering with reproducibility.

To solve the foregoing problems, a new apparatus was designed. This apparatus and the process used will appear more clearly from the following detailed description when taken in connection with the accompanying drawing, in which.

THE MAIN INSTRUMENT

Figures 1, 1A, 1B, 1C:
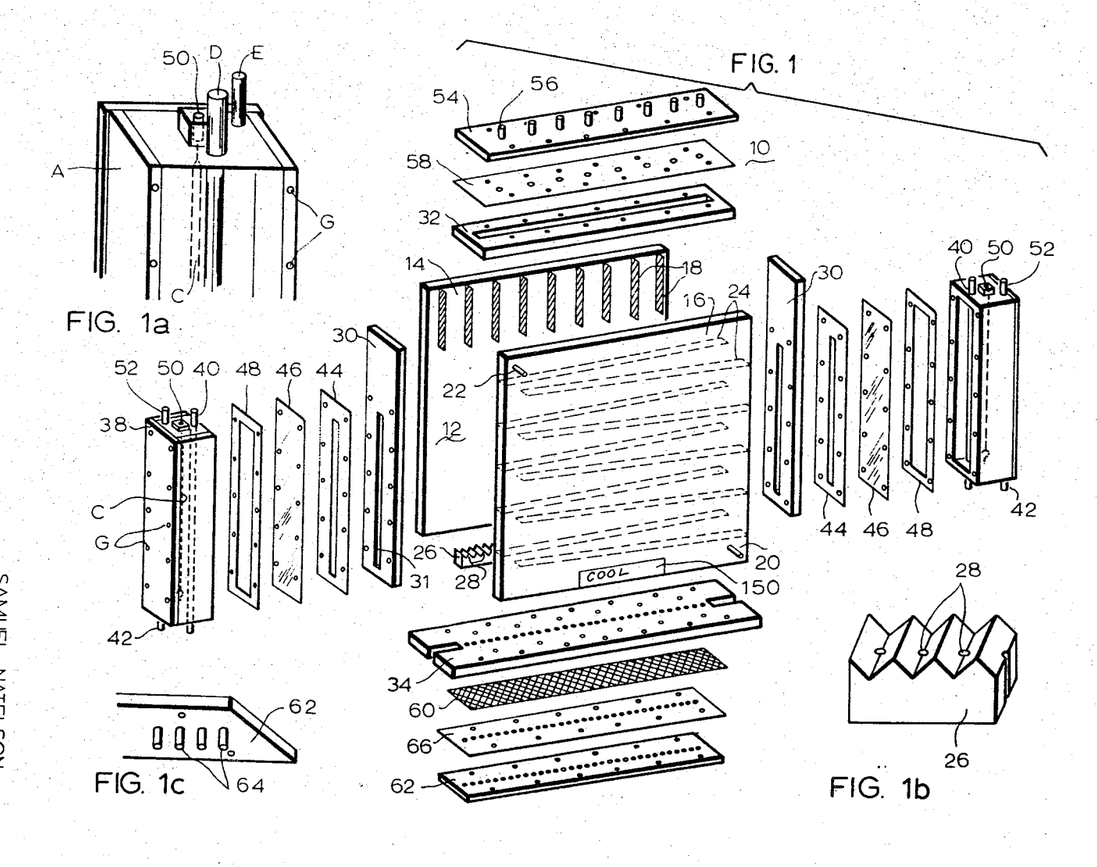
FIGURE 1 presents an exploded view showing the continuous electrophoresis instrument contemplated herein.
FIGURES 1a, 1b, 1c are enlarged perspective views of portions of the apparatus shown in FIGURE 1.
Figure 2:
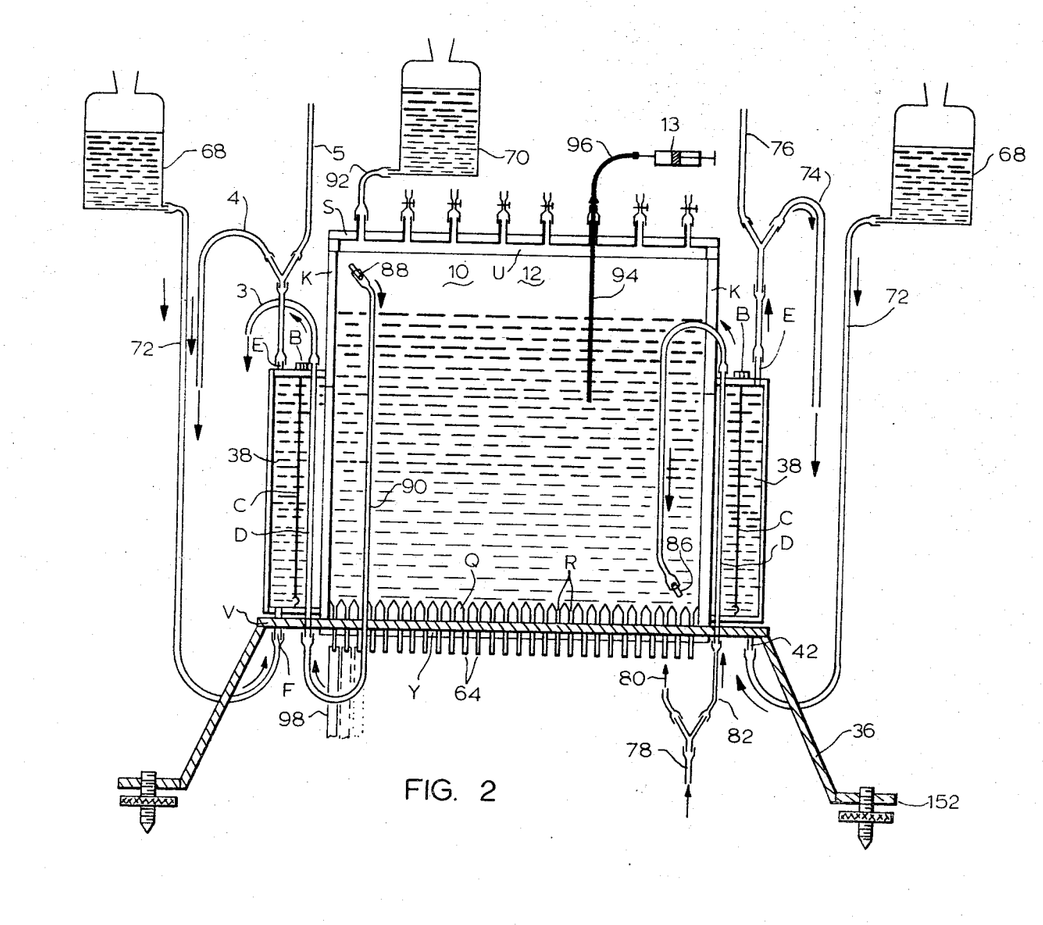
FIGURE 2 is an assembled schematic view of the instrument presented in FIGURE 1.

The instrument of FIGURES 1 and 2 differs from other instruments of the prior art in the use of gel as the supporting medium, in place of the beads; the cooling of the electrode chambers; the cooling of the whole column of buffer and gel, and the use of baffle plates to distribute the cooling liquid. In earlier machines cooling fluid entered, for example, in the lower right hand corner and left in the upper left hand corner. The upper right hand corner and lower left hand corner would overheat because the path of cooling fluid was from the lower right to the upper left by-passing the other corners. This is connected by a series of baffles which force the water to go back and forth. These are tilted upward so that entrapped air can flow up and out. Furthermore, the irregular flow of liquid from the ports is corrected by using a serrated block.

The instrument also differs from the prior art in that a support is provided at the bottom to maintain the electrophoresis chamber in a vertical position. In previous instruments, the electrophoesis chamber was supported from above which resulted in the distortion of the plastic and the development of leaks or were supported in an angular position of less than 90° with the horizontal.

In instruments of the prior art, holes were drilled in a flat block. Liquid reaching the area between these holes would have to form a channel to reach the holes. Thus, after a while, most of the liquid was flowing through certain exit holes in large quantities and or very little through others. This was corrected with the serrated block so that the flow would be even and continuous.

Figure 3:
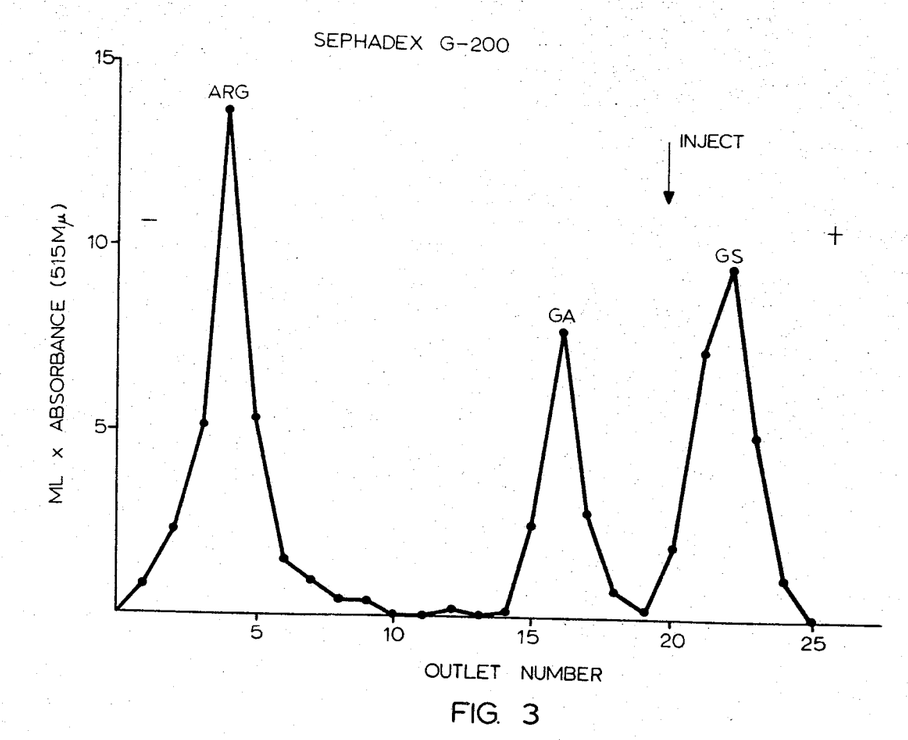
FIGURE 3 is a graphic chart obtained by a recording instrument illustrating the separation of arginine, guanidino acetic and guanidino succinic acids with the instrument of FIGURES 1 and 2 using one particular commercially available gel as supporting medium.
Figure 4:
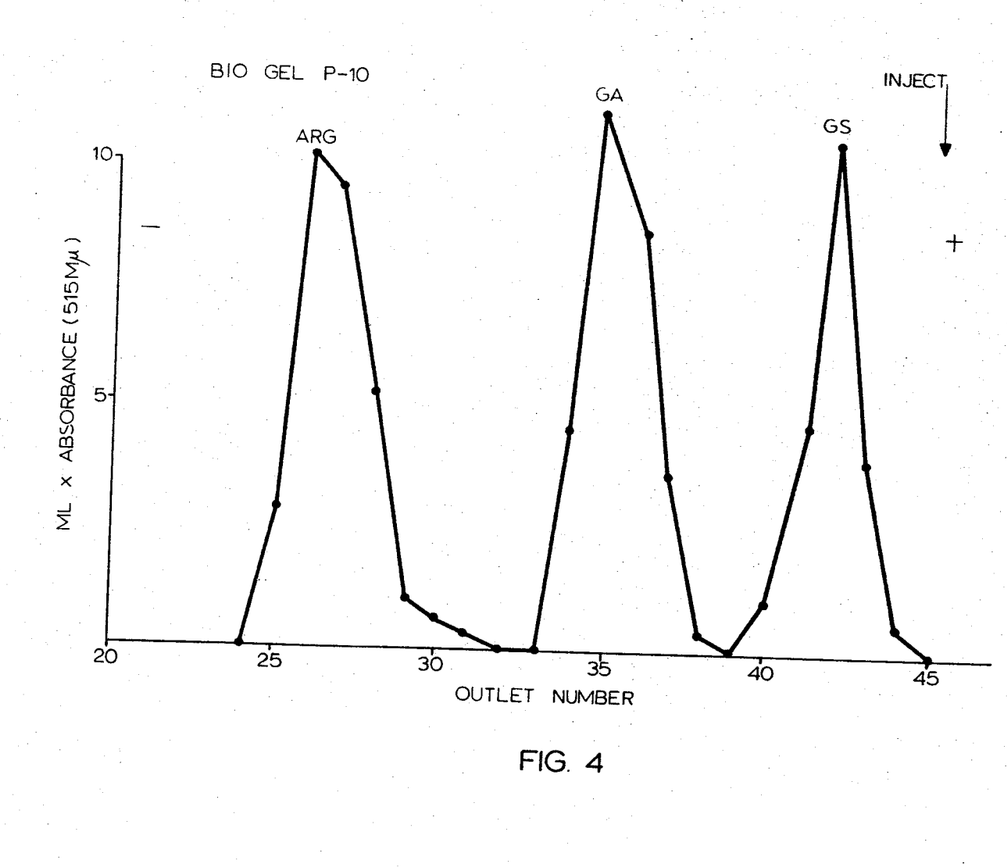
FIGURE 4 likewise depicts a graphic chart obtained by a recording instrument illustrating the separation of arginino, guanidino acetic and guanidino succinic acids with the instrument of FIGURES 1 and 2 using another commercially available gel as supporting medium.

The instruments of FIGURES 1 and 2 was applied to the separation of the guanidino derivatives under study. FIGURE 3 illustrates a recording obtained which shows the separation of arginine, guanidino succinic and guanidino acetic acid with a commercially available gel, Sephadex G-200 (a polymerized carbohydrate) with a pH 4.1 acetate buffer, 0.05 M. FIGURE 4 similarly illustrates the separation of these same substances on another commercially available gel, namely Bio Gel P-10 (acrylamide gel spherules) using a 1% acetic acid solution as buffer.

The electrophoretic separation chamber of the instrument 10 is 24" x 24" and 0.5" in width. This is cooled by tap water or refrigerated circulating fluid. Chamber 12 is formed by two boxes 14 and 16 separated by spacers 18 which are 0.5" in width, 6" in length and 1/8" in thickness. In practice there are sixteen such spacers, but only nine are shown in the drawing. The spacers hold apart the two boxes 14 and 16, maintaining the 1/2" distance in the electrophoresis chamber. The boxes are made of Lucite of 1/8" thickness except for the edge pieces holding the plates together, which are 1/4" in thickness. These boxes form the walls of the electrophoretic separation chamber. An inlet 20 at the bottom and outlet 22 at the top are provided for water or cooling fluid from a circulating cooling bath. The water travels up along the baffles 24 which are tilted to allow air to escape. The baffles are 1 3/4" apart on the low end, and tilted to rise 1/4". There are eleven baffles in each cooling box, only ten are shown. The baffles serve to distribute the cooling fluid and also to hold the box together, preventing it from bulging. The serrated block on the bottom 26 is sealed to the two cooling boxes when they are brought together.

Outlets 28 are provided in the serrated block for the flow of the buffer downward. An enlarged view of the serrated block is shown in FIGURE 1b. When the two cooling boxes are sealed together, the serrated block 26, 1/2" in thickness by 3/4" in height at its highest point, serves, together with the spacers 18 to maintain the spacing of the electrophoretic separation chamber in the center and to reinforce the cooling walls. The cooling box is countersunk 1/8" into the side walls 30 of Lucite. These side walls are 3/4" in thickness and slotted with a 3/8" wide slot 15" in length starting 3/4" from the base. This slot will permit electric contact between the gel in the electrophoretic separation chamber 12 and the electrolyte in the electrode chambers 38. The side walls are 3 1/2" in width. They are provided with a 1/4" x 1/4" tongue, top and bottom, so as to fit into the blocks 32 and 34 which are provided with 1/4" x 1/4" slots (not shown). This provides rigidity for the instrument and prevents leaks.

The bottom block 34 extends beyond the instrument so as to allow the instrument to be supported by the angle aluminum base 36 shown in FIGURE 2. The block 34 is of 1" thick Lucite and is 30.5" x 5.5". The cut groove on either end is 3/4" x 2 1/2" and permits the removal of the electrode chamber 38 so as to clear the cooling nipple 40 and the inlet tube 42 in said electrode chamber which are in line, one in back of the other, at the base of the electrode chamber. The slot in block 34, to fit the tongue on 30, is 2 3/4" from the ends on both sides. Thus the bottom block 34 overhangs the cooling boxes by 2" on each side. Block 34 is sealed to the slotted walls 30 of Lucite, the bottom of the serrated block and the bottom of the cooling boxes. There are 64 holes, 3/16" bore in the serrated block and the bottom plate which are aligned to permit the flow of buffer. The cover 32 is sealed to the top of the slotted walls 30 and the top of the cooling boxes. Cover 32 is slotted with a 3/8" x 24" slot. Cover 32 is 25 1/2" x 3 1/2" x 3/4". This portion of the apparatus forms a permanent assembly.

The electrode chambers 38 are removable and attached to the walls 30 by a gasket arrangement. First, there is a 1/8" thick gum rubber gasket 44 slotted with a knife and cut with holes by means of a cork borer so that the holes coincide with those in wall 30. A cellophane strip 46 is perforated with a cork borer in the same way. Finally, there is another outer rubber gasket 48. The electrode chambers are provided with a thin platinum ribbon, attached to an electrical socket 50. Passing through the electrode chambers are the cooling tube 40 and the inlets 42 and outlets 52 for buffer flow.

In assembling the instrument, stainless steel bolts are passed through the 3/16" holes in the electrode chambers, the gaskets and walls 30, and tightened with wing nuts. The rubber gaskets provide a seal so that the electrode chamber is separated from the electrophoresis zone between the cooling plates by cellophane. If a breadcloth or nylon net is used in place of the cellophane then it is necessary to extend the outlet 52 above the level of the top of the instrument since a difference in levels can then not be maintained between the chamber containing the gel and the electrode chamber. An enlarged view of the upper part of the electrode chamber is shown in FIGURE 1a.

The upper cover plate 54 with sample supply nipples, 56 is attached with stainless steel screws to cover 32 and sealed with the rubber gasket 58. It is through this plate that buffer and sample are added to the electrophoresis chamber. The eight nipples 56 permit the addition of the sample at different points between the electrodes.

The gel is kept in place with the broadcloth or nylon net 60, the ends of which are painted with rubber cement which is allowed to dry, so as to form a barrier to prevent the solution from moving outward. This is held in place by bottom plate 62 which is 25 1/2" x 3 1/2" x 1/2" Lucite and is provided with nipples 64, shown in detail in FIGURE 16. A gasket 66, made of rubber, is inserted between bottom plate 62 and net 60 to prevent leaks. Stainless steel bolts with wingnuts fit through holes, provided on the edges, hold bottom block 34, net 60, gasket 66 and bottom plate 62 together.

A flat schematic view of the assembled instrument is shown in FIGURE 2. Flasks 68 and 70 above the instrument are filled with buffer solution and kept at a constant level with a constant levelling device, not shown. The constant level is maintained in each bottle by a second bottle (reservoir, not shown), filled with buffer and sealed at the top with a rubber stopper. A tube with an 8 mm. bore extends from the reservoir and is dipped into the bottle 68 or 70 to the desired height. When the level in the bottle drops, air travels up the 8 mm. bore tube and more liquid comes out to retain the original level. The liquid in the reservoirs is then retained by air pressure in the bottles 68 and 70.

Buffer from 68 flows down tube 72 and into the first electrode chamber through inlet 42. It flows out of the electrode chamber through tube 74 to drain. Flow is maintained at 200 ml. per hour by fitting tube 74 with a screw clamp. An air vent 76 is used to allow escape of air bubbles and gases accumulating in the electrode chambers. The buffer in the electrode chambers is thus replaced continuously.

Cooling fluid (e.g. tap water or circulating fluid from a refrigerated circulating bath) is admitted through the inlet at 78. This divides into two branches, one branch 80 going through to the cooling box 14 in the back and one going through branch 82. The cooling fluid flows through a Lucite tube, 1/2" O.D. with 1/16" wall and continues out of the top and into the cooling box through a Tygon tube downward, to nipple 86. It moves back and forth through the baffles and finally out at exit nipple 88.

From there it goes through the Tygon tube 90 to enter the cooling tube in the second electrode chamber and finally exits to the drain.

The cooling fluid coming through Tygon tube 80 goes directly to the nipple in the cooling box 14 in the back, the cooling fluid then exits to the drain. Preferably cooling fluid, going through the back cooling box, cools one electrode chamber, and cooling fluid, going through the front cools the other electrode chamber. The arrangement of FIGURE 2 is shown for simplicity of observation of the method of cooling.

The buffer from bottle 70 can be admitted from any of the points at the top. It is shown connected through Tygon tube 92 for convenience. This buffer fills the buffer chamber, which has previously been filled with gel, to approximately six inches above the height of the electrode chamber. With the nipples 64 open the buffer flows continuously. Each one of these nipples is connected by means of Tygon tubing through a controlled clamping arrangement to a different collecting bottle of 250 ml. capacity. Thus there are 64 bottles. The Tygon tubing lies on a shallow grooved plate with 64 grooves so that when pressure is applied, all 64 openings are closed By intermittently applying pressure and releasing it, the rate of flow is controlled or if desired, stopped altogether.

The sample is injected by a syringe whose motion is activated by a motor driving a plunger at a desired rate to deliver, usually, from 1 to 20 ml. per hour. This is connected to a capillary tubing 94 of 1 mm. bore and 6 mm. O.D. through Tygon tubing 96. This is sealed to the nipple with Tygon tubing as shown. The capillary tube may be raised or lowered to admit a specimen at the desired height. Usually it is admitted about two inches above the height of the electrode chamber.

The instrument is mounted on angle aluminum 36 with four supports, of adjustable height for levelling the instrument. This supports the instrument on the lower block 34. When the bolts are removed the electrode chamber can then be removed and lifted out due to slot in block 34.

A power supply able to supply up to 1,000 volts at 500 ma. is required for operation. By means of banana plugs, the power is supplied to the electrodes by plugging in at plug 50.

THE FLOW CONTROL MEANS

Figure 5:
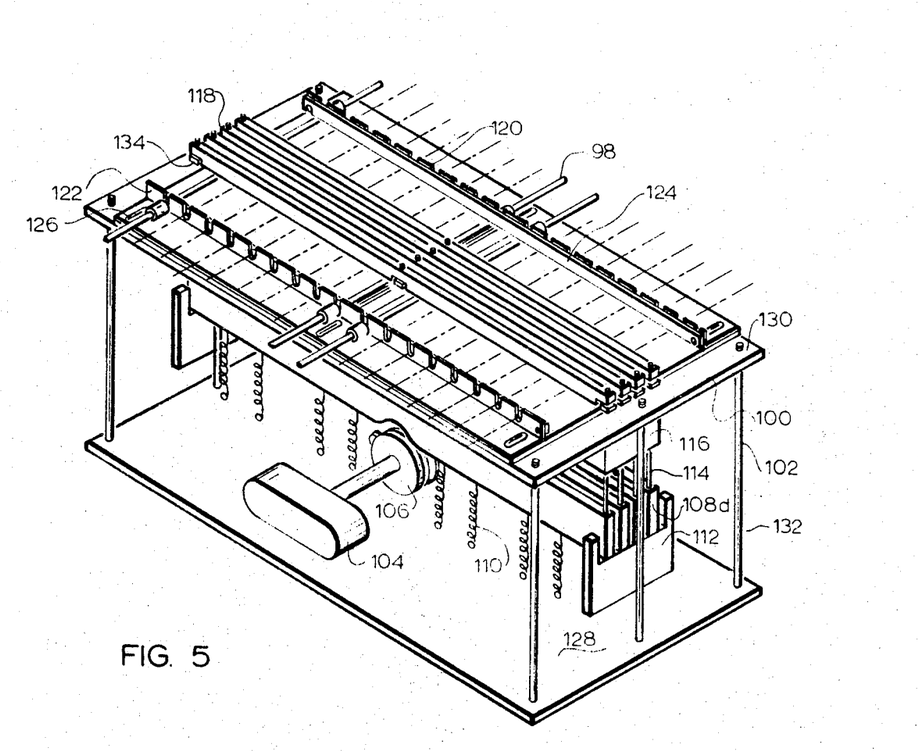
FIGURE 5 illustrates in perspective a version of flow control means used in connection with the apparatus of FIGURE 1.
Figure 6:
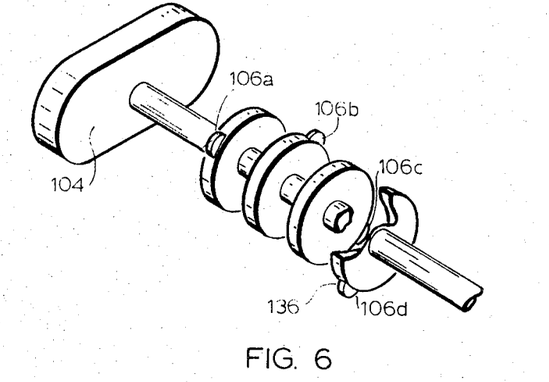
FIGURE 6 shows in perspective the drive arrangement for the flow control means of FIGURE 5.
Figure 7:
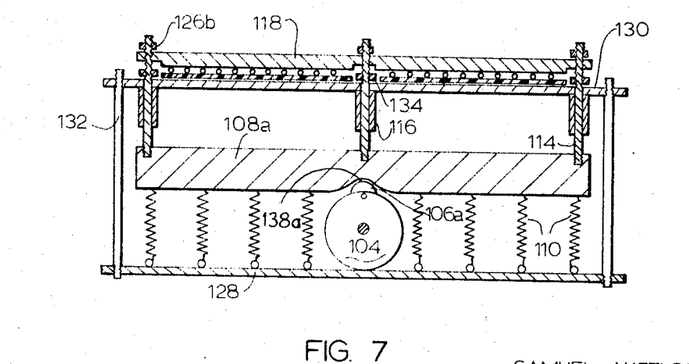
FIGURE 7 is a cross-sectional view of the arrangement illustrated in FIGURE 5.
Figure 8:
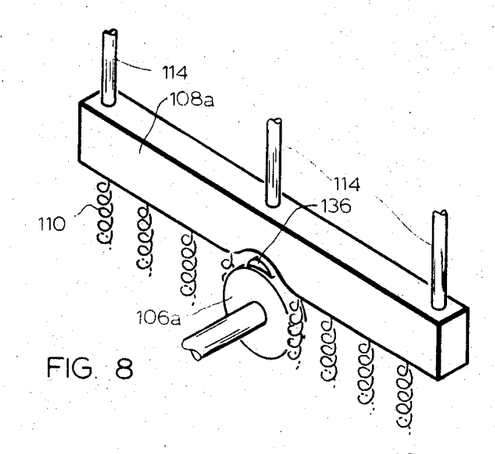
FIGURE 8 presents a portion of the drive arrangement shown in FIGURE 6.
Figure 8A:
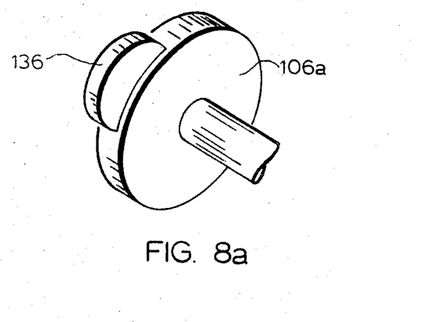
FIGURE 8a is a perspective view of a cam.

For efficient operation, it is important that the rate of flow be the same for each port and be constant. This requires an even pressure on 64 tubes simultaneously. Further, the pressure must be large in order to pinch 64 tubes simultaneously and the pressure must be evenly distributed. No commercially available instrument was found suitable for this purpose. To this end, the arrangement 100 shown in FIGURE 5 is provided. This arrangement can handle the output of sixty-four outlets. The arrangement 100 is contained in a box-like frame 102. A centrally disposed motor 104 drives four cams 106a to 106d which are angularly offset from each other. Disposed across the box-like frame 102 are sets of lifting bars 108a to 108d. These bars are held downwards by springs 110, and are guided by guideblock 112 so as to reciprocate vertically when engaged by one of the cams 106a to 106d. Each set of lifting bars 108 is attached to rods 114, passing through bearings 116. The rods in turn are attached to clamp or press bars 118 so that there are at least four clamp bars corresponding to the four cams. These press bars 118 will be lowered in sequence as follows: first up, second up, third up, first starts to come down as the fourth starts to go up, then first comes down, second comes down, third comes down, fourth comes down, while first starts to go up. The sequence is then repeated. Outlet tubes 98 made of Tygon are held under tension in slots 120 of adjustable angle supports 122. The tubes are kept from leaving the slots by set bars 124. The angle supports and set bars are adjustable by wing nuts 126a. The various bars extend out to frame 102 which includes bottom and top aluminum flat plates 128, 130 as well as the necessary support bars 132. In order to act on sixty-four tubes simultaneously, spring tension by springs 110 is provided, thirty two springs (eight on each bar) on each side being provided. The press bars are all removable and held by knurled fastening means, i.e., wing nuts 126b, to blocks 134 which rise and fall with rods 114. The actual movement of the cams may perhaps be better understood from a study of FIGS. 6, 7, 8, and 8a. From these figures, it will be noted that the springs cause the press bars to clamp the flexible tubes sequentially drawing the liquid forward. The cams serve only to lift the bars and release the tubes. Thus, the liquid is driven forward by the springs.

Figure 9A:
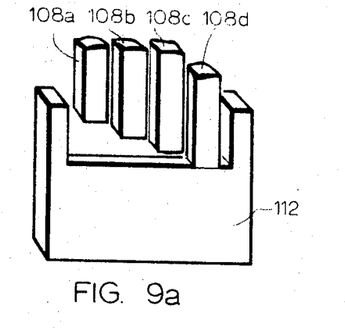
FIGURES 9a, 9b and 9c illustrate some of the link features of the arrangement of FIGURE 5.
Figure 9B:
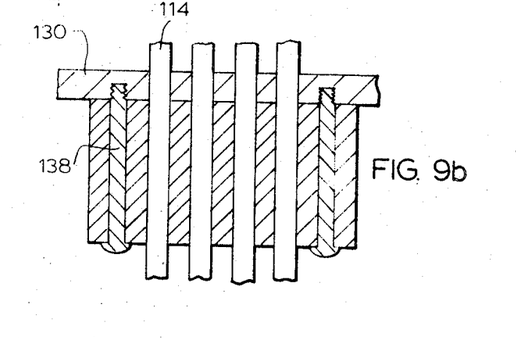
Figure 9C:
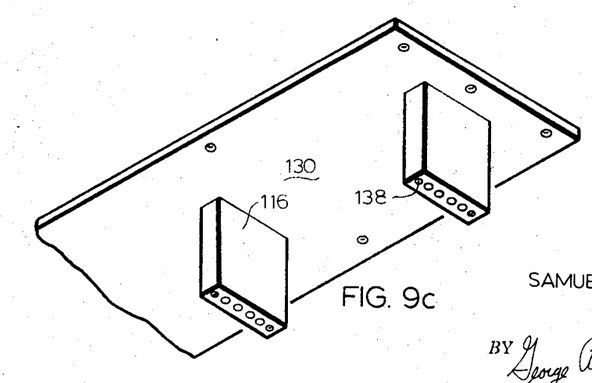
Figures 10, 11:
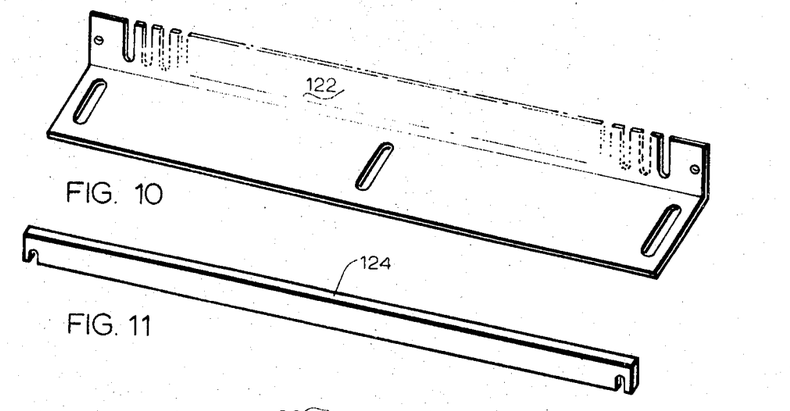
FIGURE 10 shows in perspective another constructional feature of the arrangement of FIGURE 5.
FIGURE 11 depicts in perspective yet another constructional feature of the arrangement of FIGURE 5.
Figure 12:
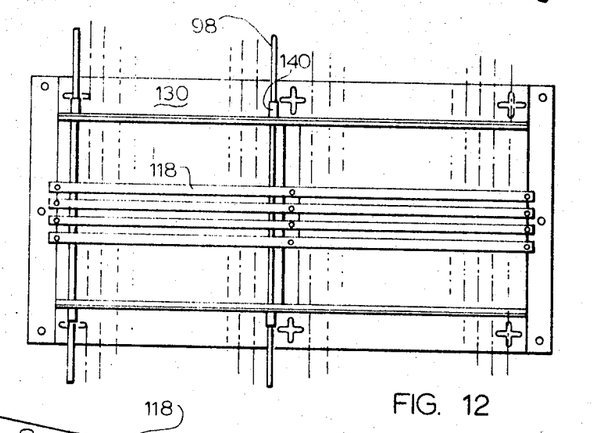
FIGURE 12 shows a top view of the arrangement of FIGURE 5.
Figure 13:
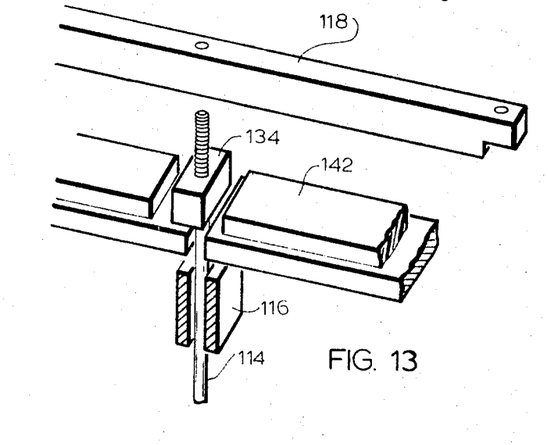
FIGURE 13 is another constructional feature of the arrangement shown in FIGURE 5.

The cams 106a to 106d are of stainless steel and disc-like in shape, of about 2″ radius. Pinned to the outer periphery of the disc are smaller wheels about ¾″ diameter. These outer wheels are the wheel cam member 136. These wheel cam members are angularly offset on the different cams. In this manner, each cam 106a to 106d will lift the corresponding lift bar 108a to 108d for the desired time period. The lift bars 108a to 108d each have a curved center recess 138 which will be gradually engaged by the respective wheel cam member so as to provide a gradual even rise to the lift bar of about ⅜″ but in any event not less than ¼″. Lift bars 108a to 108d are guided in a horseshoe shaped guide 112 (FIG. 9a) and are fastened to reciprocating sliding rods 114 passing through a block acting as bearing 116, which is fastened to top plate 130 by bolts 138 passing through the entire bearing (FIGS. 9b and 9c). The Tygon tubing 98 is held by stoppers 140 in the pump as shown in FIG. 12 and disposed at right angles to press bars 118. As shown in FIG. 13, the press bar 118 is fastened to rod 114 over block 134. The lowering of the press bar 118 will squeeze the tubing against a smooth plastic press plate 142. The tubing 98 is placed in adjustable angle supports 122 which have a sixty-four ⅛″ slots about ⅛″ apart, except where the rods pass, as shown in FIG. 11. The stoppers 140 are on the outer side of the angle support 122 and set bars 124 disposed over the angle supports keep the tubes in place. The speed required is rather slow, about two r.p.m. and can be varied. Speeds of between one and ten r.p.m. are preferable.

INSTRUMENT OPERATION

The instrument is assembled completely. The exit ports connect to 64 flexible tubes disposed in clamp means. These tubes are guided into collecting bottles or test tubes. The gel to be used is mixed with buffer and allowed to swell at least overnight, preferably for several days. The volume of gel to be used is calculated by the data given by the manufacturer for the specific gel. The chamber which holds the gel is 24″ x 24″ x ½″. This is approximately the same as 61 x 61 x 1.27 centimeters or a volume of approximately 4.7 liters. Actually 4 liters of swelled gel is used since the gel extends vertically about 85% of the 24 inches. This requires approximately 140 grams for Sephadex G 200 which swells to 30–40 times its volume and 240 grams of Bio Gel P–10 which swells to approximately 18 times its dry volume.

The suspended gel is poured into the instrument with all the nipples 64 closed by the clamp means. Any of the sample supply nipples 56 may be used, using a funnel attached to the nipples by means of plastic tubing. When full, the gel is allowed to settle, and the buffer is removed by opening the exit port nipples 64 until the buffer level is just above the gel level. This is repeated until the gel fills all but the last four inches of the chamber. The gel is allowed to settle overnight.

The electrode chambers are filled meanwhile from the buffer bottles 68. Clamps (not shown) on hose 72 control its flow. The flow of cooling water is started, from the tap or if desired, from a circulating refrigerated bath kept at 4° C. The voltage is applied and current is allowed to flow for one hour until the voltage and current is constant.

The syringe is filled with the liquid to be applied (FIGURE 2), and the liquid is added at the desired rate. For a 1% acetic acid buffer the voltage used was 500 volts at 150 ma.

With a commercially available gel solid under the trade name of Sephadex 200, the flow through the gel is approximately 18 ml./hour at each part. With Bio Gel P-10 the flow is very rapid (100 ml./hour).

The instrument can be used in two ways. The examples are for guanidine derivatives. In the continuous mode the sample (e.g. concentrated urine) is injected at 5 ml. per hour until the whole sample had been added. Collection at the ports through the flow control means is set at 15 ml./hour. In the discontinuous mode, which we have used mainly with Bio Gel P-10, the ports are kept closed. The sample (e.g. 10 mM. solution) is injected for 15 minutes (1 ml.). Injection is stopped and electrophoresis was allowed to continue for 6 hours. At the end of that time the nipples are opened and the buffer was allowed to flow freely for ½ hour when all the guanidino derivatives were removed. At that time 57 ml. of buffer was found in each collecting bottle. Either method produces similar results. In the continuous mode, with Sephadex 200, collection continues for 4 hours after the final sample has been added. In either case the current is not turned off until all the samples have been collected.

The collecting bottles may be square bottles or test tubes packed closely and housed in a refrigerated box or water bath to preserve the eluates.

The outlet ports are connected to 64 flexible tubes under tension in the instrument of FIG. 5 These outlets of these tubes lead to the collecting bottles or test tube. The instrument of FIG. 5 may be shut off to act as a clamp for the 64 tubes and then may be run at the end of a run to collect fractions or it may be run in the continuous mode described above.

The foregoing instrument serves to separate guanidino derivatives sharply. When acetic or formic acid, or mixtures of these acids are used as the electrolyte, the salts migrate rapidly and pass into the electrode chamber where they are washed to the drain. The eluates may then be lyophilized to produce salt free products. For this reason the instrument is of particular value in the final purification of a material under study.

The instrument can be generally applied to separations of polar compounds including the polypeptides. For example, a crude preparation of vasopressin (100 mg.) was placed in the apparatus and processed for 10 hours using 1% acetic acid as the electrolyte and Sephadex 200 as the supporting medium. Almost a quantitative yield (19 mg.) of a salt free preparation of pure vasopressin was obtained. Separation of other hormonal polypeptides can also be carried out.

The apparatus also permits selection from the wide range of supporting media available, used in column chromatography, such as the cellulose materials, ion exchange resins and inorganic supports such as silica gel and aluminum oxide. In this way a problem can be fitted to the support which serves the best purpose.

It is to be observed therefore that the instrument of the present invention remedies most of the problems of the instruments of the prior art. Cooling is evenly distributed by means of baffle plates disposed in such a way as to permit exit of entrapped air. The electrode chambers are adequately cooled. With this instrument it is possible to use a gel such as Styragel (a styrene gel), Biogel (an acrylamide gel) or Sephadex (a polymerized carbohydrate gel). In addition, the gel may have attached either a negative or positive group so as to have the properties of ion exchange. Thus the various ion exchange cellulose supporting mediums, acrylic acid polymers with free carboxylic groups such as Amberlite C.G. 50 or styrene sulfonic or carboxylic acid resins gels or amino or substituted amino styrene resins may be used. In addition ion exchange Sephadex may be substituted for neutral Sephadex.

Of special significance is the solution of the problem of channeling. This has been solved by disposing at the bottom of the gel chamber, take-off ports of wedge shaped design so that fluid coming down, which is not directly above the exit ports is guided through the exit ports. In earlier design where a flat piece of plastic was drilled to produce exit ports, the fluid coming down had a chance of going to exit ports on either side. Soon channels would form and one exit port would get most of the liquid and the other very little.

The electrode chambers are provided with inlets and outlets so that buffer continuously enters and exits to clear these chambers of products of electrolysis and prevent polarization of the electrodes.

In addition, means are provided for adding the sample at varying heights in the electrode chambers so that the time the material is being subjected to the electric current may be varied at will. Thus if the material exits from the instrument in five hours, by adding the substance at twice the height it will exit in ten hours. For proteins of high molecular weight the higher height is used. For low molecular weight polypeptides or organic compounds such as guanidino derivatives the lower heights would be used.

A combination of gels may be used. For example in separating guanidino compounds we use advantageously one inch of Bio Gel P-10 (acylamide porous gel) and twenty inches of Sephadex 200 (a gel of low porosity). Thus the porous gel prevents the clogging of the outlets, the gel of lesser porosity doing the separating of the material.

The instrument can be operated with exit ports open at all times keeping the entrance of buffer at the top at constant level for constant pressure. This mode is used when gels of low porosity are used so that from each port, volumes of less than 25 ml. per hour are exiting into the collection tubes or bottles.

In another mode the rate of exit from the ports can be controlled by a slow acting exit control. The conventional designs of the prior art were inadequate when tested because of the need for even flow from a large number of ports. In the case cited sixty-four ports are used and a device of low capacity (5-25 ml./hr.) had to be designed, each tube receiving the same volume per hours.

The collection tubes are preferably contained in a refrigerated container which may be cooled by the circulating of cooling fluid from the instrument proper or may have its separate cooling system.

The exit control comprises a series of parallel press bars 3/16" x 1" in width and height respectively and 18 inches long disposed parallel to each other and clamped to the sixty-four Tygon tubes horizontally disposed and at right angles to the bars, by a series of springs. In effect, the tubes are clamped on a flat bed. A series of cams lifts each press bar sequentially permitting flow of liquid into the tubes. The press bars are then returned to their original position by springs in the same order so that the liquid is forced forward to the collection bottles.

Of importance is the use of springs to maintain even pressure on the tubes. The motor and cams act only as bar lifters and spring extensions. Excessive pressure is therefore not applied to the tubes to wear them out by scuffing. The movement of the liquid is therefore controlled by springs the tension of which can be adjusted for adequate tension. The distribution of the force over a large number of springs thus supplies a high pressure with each spring contributing a small pressure.

By using the arrangement herein described, it is possible to extract fractions from sixty-four outlet tubes or more. The drive means does not control the fluid flow, but instead acts on press bars through a connecting link arrangement, while tension is maintained by means of a multiplicity of springs. The press bars are supported not only at the ends but also in the center and are removable, at least three press bars being required. The press bars are in turn lifted by rods acted on by lifting bars moved by cams. These rods are maintained in position by passing through bearings. The outlet tubes are kept in position by bars holding them down in slots. A compact practical instrument for sixty-four tubes will measure about 10" x 20" and be 10" in height.

In the light of the foregoing, the present invention provides for an apparatus for preparative continuous electrophoresis. The supporting medium is a gel contained in a 24" x 20" x ½" container cooled on both sides by a flow of liquid coolant. A buffer flows by gravity, or may be pumped downward. Electrophoresis proceeds laterally and the eluates are collected from ports at the base. Exit flow is controlled by spring loaded clamps which clamp all 64 tubes simultaneously. A serrated block at the bottom assures even distribution of the flow through exit ports. The electrode chambers are also cooled. Buffer in the electrdoe chambers, which are separated from the gel by cellophane, is constantly changed to remove salts and electrolysis products at the elecrtodes. The instrument can be used for the separation of guanidino compounds with commercially available gels such as Sephadex 200 and Bio Gel (acrylamide) P-10. The instrument is also generally applicable to separation of polar compounds such as polypeptides or other organic compounds.

The instrument 10 comprises, a flattened elongated sample separation chamber 12 with a serrated block bottom 26 having outlet nipples 64 or ports originating at the low points 28 in the serrated block bottom. The bottom also includes support means for supporting a porous material 60 of a porosity to allow the electrolyte to escape but to retain a supporting medium. A cover 54 on the separation chamber has a plurality of inlet capillary nipples 56 or ports through which a sample can be supplied at various lateral positions along the cover. Each of the flattened side walls of the separation chamber 12 are defined by cooling boxes 14 forming a passage for the flow of cooling fluid and for the escape of air. Removable electrode chambers 38 are disposed at both ends of the separation chamber 12 and communicate with the separation chamber through a narrow passage 31 serving to retain the supporting medium in the separation chamber but allowing electric contact to said medium, said electrode chambers 12 including cooling means 150 for cooling an electrolyte therein, inlet and outlet ports 42, 56 for the flow of an electrolyte through the electrode chambers 38 so as to remove the product of electrolysis, also, electrodes for impressing an electric field across the separation chamber with connecting means 50 for connecting the electrodes to a power source, and lateral support means 48 to support a porous membrane 46 over said narrow passage. To regulate the flow of liquid through the outlet nipples 64 or ports, flexible tubes 98 are attached to the outlet ports at the base of the instruments. These tubes are aligned on a flat plate 130 so that clamp bars held down by clamps can open and close these tubes simultaneously at regular intervals. These tubes lead to a refrigerated container containing as many collection flasks as there are outlet ports so that the electrolyte which emerges from the separation chamber can be kept at a low temperature to preserve heat sensitive components. Separate electrolyte reservoirs 68 maintain the electrolyte at a constant level so that the electrolyte flows evenly through the electrode chambers and the sample separation chamber. The sample is pumped through the inlet nipples or ports through metered sample injection pumps. The porous material used at the bottom of the separation chambers should preferably have a water impervious border so as to prevent the electrolyte from moving outward from the net. The instrument is supported at its bottom with a plastic block support extending on all sides so that the instrument may be supported on a base with feet 152 having levelling screws to adjust the levelling of the instrument.

Furthermore, it is also to be observed that the present invention utilizes a flow control arrangement 100 to act on a plurality of resilient tubes 98 extending from each outlet port or nipple. This flow control arrangement includes a top flat plate 130 for supporting the tubes, slotted angle supports 122 at both sides of the flat plate for receiving and holding the outlet tubes, spring loaded press bars disposed normal to said outlet tubes held firmly in place with springs so as to clamp the outlet tubes closed, and reciprocating means acting in a predetermined sequence so as to lift said press bars sequentially in a predetermined sequence and move the contents in an even flow through each tube from each outlet to receiving containers. The reciprocating means includes at least three, preferably four cams which are angularly offset, drive means, i.e., motor 104 to drive the cams, lifting means or bars 108a to 108d responsive to the cams, and connecting means between the lifting means and the press bars. Each cam includes a disc portion rotated by the drive means and a cam wheel 136 pivoted to the periphery of the disc portion. The connecting means consists of a plurality of rods 114 between the lifting means and the press bars with bearings 116 through which the rods travel.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. An apparatus for the separation of substances by a combination of electrophoresis and gel filtration, comprising in combination,
   (a) a flattened elongated sample separation chamber with a serrated block bottom having outlet ports at the low points in the serrated block bottom and a cover having a plurality of inlets through which a sample can be supplied at various lateral positions along the cover;
   (b) a pair of flattened hollow side walls for the separation chamber each defining cooling boxes therein including angularly disposed baffles allowing the even distribution of cooling fluid and allowing the escape of air;
   (c) electrode chambers, disposed at both ends of the separation chamber including cooling means for cooling an electrolyte therein;
   (d) porous means at the bottom and ends of the separation chamber for supporting and retaining a gel medium therein but permitting the passage of electric current therethrough; and
   (e) electrodes in said electrode chambers for impressing an electric field across the separation chamber including circuit means for connecting said electrodes to a power source.

2. An apparatus as claimed in claim 1 including inlet and outlet ports for the flow of an electrolyte therethrough so as to remove the products of electrolysis.

3. An apparatus as claimed in claim 2, including at least one baffle between the electrode chambers and the sample separation chamber defining an elongated narrow slit.

4. An apparatus as claimed in claim 1, including a support for the apparatus, plastic block base disposed on said support and levelling screws to adjust the level of the instrument.

5. An apparatus as claimed in claim 4, including separate electrolyte reservoirs to maintain the electrolyte at a constant level.

6. The instrument of claim 1 wherein separate outlet tubes can extend from each outlet port, a flow control arrangement to simultaneously act on said outlet tubes, comprising,
 (a) a flat plate;
 (b) slotted angle supports at both sides of said flat plate for receiving and holding said outlet tubes;
 (c) spring loaded press bars disposed normal to said slotted angle supports and adapted to clamp the tubes closed by means of a multiplicity of springs; and
 (d) reciprocating means acting in a predetermined sequence to lift the press bars to relieve the pressure on the tubes permitting them to open to allow liquid to flow into and out of said tubes so as to move the liquid to collecting containers, the flow of liquid in all the tubes being the same volume per unit of time.

7. The instrument of claim 6, said reciprocating means including, at least three cams axially aligned but angularly offset, drive means to drive the cams, lifting means responsive to each cam when acted on by the cam, and, connecting means between the lifting means and the press bars.

8. The instrument of claim 7, said cams each including a disc rotated by said drive means and a cam wheel pivoted to the periphery of said disc, said lifting means including lifting bars with a recessed center portion corresponding to the position of said cams designed to be engaged by said cam wheels and guides at each end of said lifting bars.

9. The instrument of claim 8, said connecting means including rods connecting said lifting bars and press bars and bearings through which said rods travel.

References Cited

UNITED STATES PATENTS

| | | | |
|---|---|---|---|
| 2,555,487 | 6/1951 | Haugaard et al. | 204—299 |
| 3,085,956 | 4/1963 | Caplan | 204—299 |
| 3,208,929 | 9/1965 | Raymond et al. | 204—299 |
| 3,305,471 | 2/1967 | Manchhausen et al. | 204—299 |
| 3,326,790 | 6/1967 | Bergrahm | 204—299 |
| 3,346,479 | 10/1967 | Natelson | 204—299 |
| 3,371,027 | 2/1968 | La Paglir et al. | 204—180 |
| 3,374,166 | 3/1968 | Raymond | 204—299 |
| 3,375,187 | 3/1968 | Buchler | 204—299 |

OTHER REFERENCES

Journal Chromatography, "A Convenient Migration Chamber for Electrophoresis in Solid Gels," vol. 23, No. 2, July 1966, pp. 325–329.

JOHN R. MACK, *Primary Examiner.*

E. ZAGARELLA, JR., *Assistant Examiner.*

U.S. Cl. X.R.

204—180